(12) United States Patent
Shim et al.

(10) Patent No.: US 9,087,050 B2
(45) Date of Patent: Jul. 21, 2015

(54) MEMORY CONTROLLER AND OPERATING METHOD THEREOF

(71) Applicant: Samsung Electronics Co., Ltd., Suwon-Si, Gyeonggi-Do (KR)

(72) Inventors: Hojun Shim, Yongin-si (KR); Eunchan Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/088,909

(22) Filed: Nov. 25, 2013

(65) Prior Publication Data

US 2014/0149608 A1 May 29, 2014

(30) Foreign Application Priority Data

Nov. 26, 2012 (KR) .................. 10-2012-0134587

(51) Int. Cl.
*G06F 13/28* (2006.01)
(52) U.S. Cl.
CPC ...................... *G06F 13/28* (2013.01)
(58) Field of Classification Search
CPC ........................................................ G06F 13/28
See application file for complete search history.

(56) References Cited

U.S. PATENT DOCUMENTS

| | | | |
|---|---|---|---|
| 6,202,107 B1 | 3/2001 | Collier | |
| 6,857,030 B2 | 2/2005 | Webber | |
| 7,620,749 B2 | 11/2009 | Biran et al. | |
| 7,694,026 B2 | 4/2010 | Huffman | |
| 8,032,690 B2 * | 10/2011 | Ji et al. | 711/103 |
| 2007/0226382 A1 | 9/2007 | Chiu et al. | |
| 2007/0260756 A1* | 11/2007 | Tseng et al. | 710/5 |
| 2008/0320176 A1 | 12/2008 | Gao et al. | |
| 2009/0037689 A1* | 2/2009 | Kanuri | 711/208 |
| 2010/0077117 A1 | 3/2010 | Asnaashari | |
| 2010/0161936 A1 | 6/2010 | Royer et al. | |
| 2012/0271974 A1* | 10/2012 | Asnaashari | 710/74 |

FOREIGN PATENT DOCUMENTS

| | | |
|---|---|---|
| JP | 2007-058424 A | 3/2007 |
| KR | 10-0979825 B1 | 9/2010 |

* cited by examiner

*Primary Examiner* — Ilwoo Park
(74) *Attorney, Agent, or Firm* — Harness, Dickey & Pierce

(57) ABSTRACT

A memory controller is provided. The memory controller may comprise a first interface configured to provide an interface for communications with a host, and a second interface configured to communicate with the host through the first interface and to provide an interface for communications with a memory. The second interface may include an emulation engine configured to generate a Direct Memory Access (DMA) setup Frame Information Structure (FIS) including ready state information for data communications with the host in response to a command transferred from the host. The second interface may include a storage engine configured to access the host to fetch a physical region descriptor (PRD) before the DMA setup FIS is received from the emulation engine.

20 Claims, 7 Drawing Sheets

MEMORY CONTROLLER AND OPERATING METHOD THEREOF

CROSS-REFERENCE TO RELATED APPLICATIONS

A claim for priority under 35 U.S.C. §119 is made to Korean Patent Application No. 10-2012-0134587 filed Nov. 26, 2012, in the Korean Intellectual Property Office, the entire contents of which are hereby incorporated by reference.

BACKGROUND

The inventive concepts described herein relate to a memory controller and an operating method thereof.

A semiconductor memory device is a memory device which is fabricated using semiconductors such as silicon (Si), germanium (Ge), gallium arsenide (GaAs), indium phosphide (InP), and on the like. Semiconductor memory devices are classified into volatile memory devices and nonvolatile memory devices.

Volatile memory devices may lose stored content when powered-off. Volatile memory devices include a random-access memory (RAM), static RAM (SRAM), a dynamic RAM (DRAM), a synchronous DRAM (SDRAM), and the like. Nonvolatile memory devices may retain stored content even when powered-off. Nonvolatile memory devices include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and on the like.

A semiconductor memory device may be controlled by a memory controller. The memory controller may communicate with a host through a host interface. That is, the memory controller may write or read data at or from the semiconductor memory device according to a host request. The nonvolatile memory device and the memory controller may constitute a data storage device. As an operating speed of a host is faster and a bandwidth of the host interface is improved, a demand on improvement of the performance of the memory controller may increase.

SUMMARY

Some example embodiments of the inventive concepts relate to a memory controller and an operating method thereof.

In one example embodiment, a memory controller is provided. The memory controller may comprise a first interface configured to provide an interface for communications with a host, and a second interface configured to communicate with the host through the first interface and to provide an interface for communications with a memory. The second interface may include an emulation engine configured to generate a Direct Memory Access (DMA) setup Frame Information Structure (FIS) including ready state information for data communications with the host in response to a command transferred from the host. The second interface may include a storage engine configured to access the host to fetch a physical region descriptor (PRD) before the DMA setup FIS is received from the emulation engine.

In example embodiments, the storage engine includes an Advanced Host Control Interface (AHCI).

In example embodiments, the emulation engine is configured to perform a data communication with the host before sending the DMA setup FIS to the storage engine.

In example embodiments, the emulation engine is configured to perform the data communication with the host independently while generating the DMA setup FIS.

In example embodiments, the first interface is a Peripheral Component Interconnect express (PCIe) interface and the second interface is an Serial AT Attachment (SATA) interface.

In example embodiments, the storage engine includes a PxCI register and the storage engine is configured to recognize a command issued from the host by setting the PxCI register with a bit value.

In example embodiments, the memory controller may further comprise a FIFO memory configured to store the PRD.

According to another example embodiment of the inventive concepts, an operating method of a memory controller is provided. The method may comprise receiving a command issued from a host; fetching a command corresponding to the issued command in response to receiving the issued command; fetching a physical region descriptor (PRD) from the host based on the fetched command; and generating a Direct Memory Access (DMA) setup Frame Information Structure (FIS) including data communication ready state information corresponding to the issued command.

In example embodiments, the fetching a command may comprise fetching a command header corresponding to the command, and fetching a command frame indicated by information in the command header.

In example embodiments, the fetching a may comprise executing the fetched command according to information contained in the command header.

In example embodiments, the operating method may further comprise performing data communication with the host according to the PRD, and the performing the data communications is independent from the generating.

In example embodiments, the performing data communication occurs before the generating.

In example embodiments, the performing data communication is based on an interface, the interface is included in the memory controller and is recognized as storage by the host.

In example embodiments, the performing data communication is based on an Advanced Host Controller interface (AHCI) included in the memory controller.

In example embodiments, the operating method may further comprise transferring the DMA setup FIS to the host.

According to another example embodiment, a method of operating a memory controller including a first interface and a second interface may comprise receiving a command issued by a host via the first interface, and fetching a command corresponding to the issued command from the host in response to receiving the issued command.

In example embodiments, the fetching may comprise fetching a command header from a command table in a system memory of the host in response to the issued command, and fetching a physical region descriptor (PRD) from a physical region descriptor table of the host in response to a issued command.

In example embodiments, the method may further comprise setting a register to include a value indicating that the issued command was received from the host.

In example embodiments, the second interface may include an Advanced Host Control Interface (MCI) and the register may be a PxCI register.

In example embodiments, the method may further comprise receiving data from a system memory if the issued command is a write command, and transmitting data to the system memory if the issued command is a read command.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
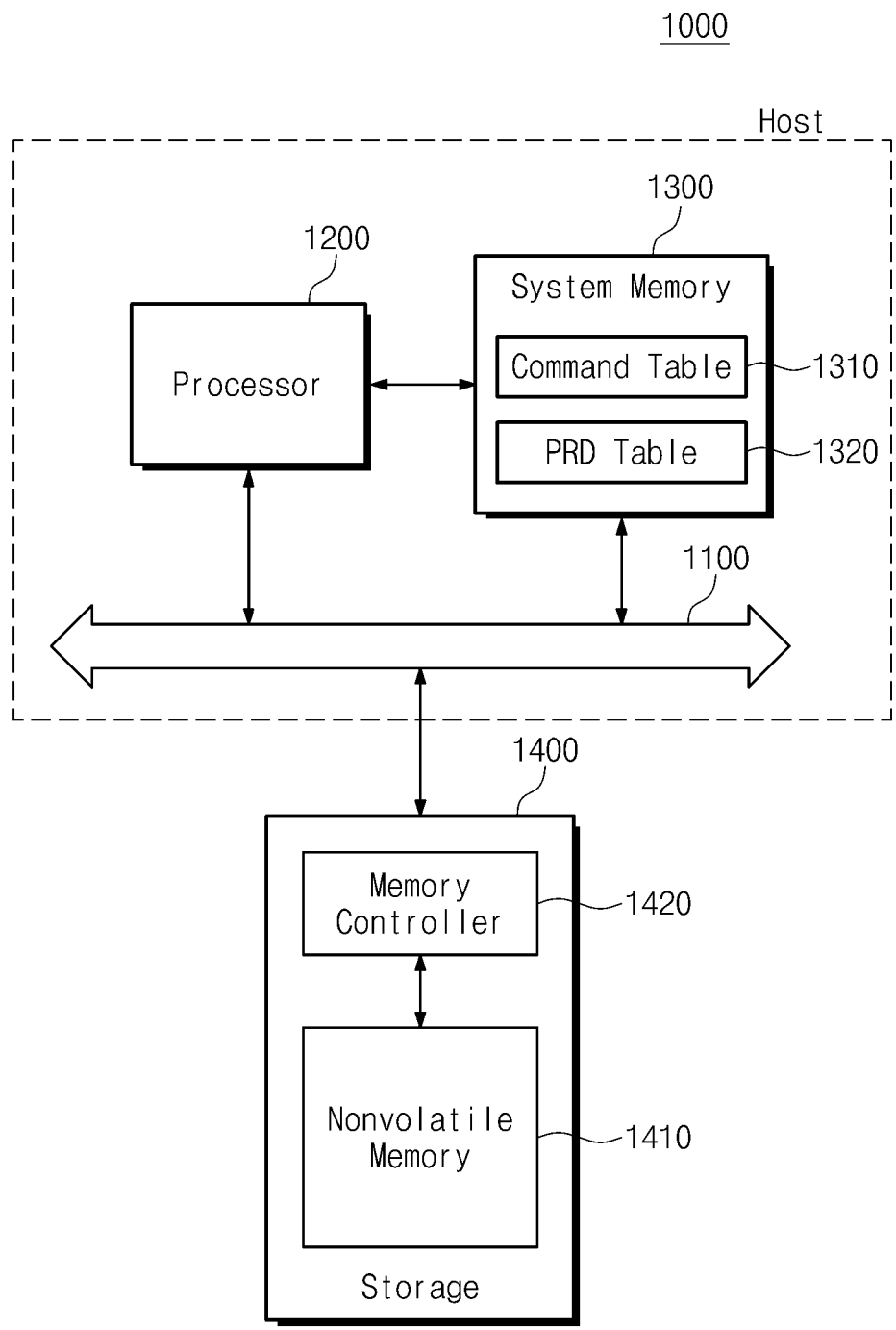
FIG. 1 is a block diagram schematically illustrating a computing system according to an example embodiment of the inventive concepts.

Embodiments will be described in detail with reference to the accompanying drawings. The inventive concepts, however, may be embodied in various different forms, and should not be construed as being limited only to the illustrated embodiments. Rather, these embodiments are provided as examples so that this disclosure will be thorough and complete, and will fully convey the concept of the inventive concepts to those skilled in the art. Accordingly, known processes, elements, and techniques are not described with respect to some of the embodiments of the inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating a computing system according to an example embodiment of the inventive concepts.

Referring to FIG. 1, a computing system 1000 may include a bus 1100, a processor 1200, a system memory 1300, and storage 1400.

The bus 1100 may be configured to provide a channel between constituent elements of the computing system 1000. For example, the bus 1100 may provide a channel between the processor 1200 and the storage 1400. The bus 1100 may operate based on a standard interface of the computing system 1000. For example, the bus 1100 may operate based on a Peripheral Component Interconnect express (PCIe) interface. However, according to various embodiments, the bus 1100 may not be limited to the PCIe interface. The bus 1100 may be any device which operates based on various interfaces providing channels between various constituent elements.

The processor 1200 may be configured to control constituent elements of the computing system 1000 through the bus 1100. For example, the processor 1200 may access the system memory 1300 and control the storage 1400 through the bus 1100. The processor 1200 may control the storage 1400 based on the PCIe interface. The processor 1200 may include a general purpose processor or an application processor.

The processor 1200 may store a command for controlling the storage device 1400 at a predetermined area (e.g., a command table 1310) of the system memory 1300.

The system memory 1300 may be configured to communicate with the processor 1200 and the storage device 1400 through the bus 1100. For example, the system memory 1300 may communicate with the processor 1200 and the storage 1400 based on the PCIe interface. The system memory 1300 may include a volatile memory device, such as an SRAM, a DRAM, an SDRAM, or other like volatile memory devices. The system memory 1300 may additionally (or alternatively) include a nonvolatile memory device, such as a phase change RAM (PRAM), a magnetic RAM (MRAM), a resistive RAM (RRAM), a ferroelectric RAM (FRAM), or other like nonvolatile memory devices.

The system memory 1300 may include a command table 1310 and a physical region descriptor (PRD) table 1320. The command table 1310 may store commands issued from a host. A command may include a command header (CH) and a command frame, (i.e., a Command Frame Information Structure (CFIS). The command header CH may include information indicating a location where the command frame CFIS is stored.

The physical region descriptor table 1320 may store a physical region descriptor PRD. The physical region descriptor PRD, for example, may include location information of data corresponding to a command generated from the host. In detail, the physical region descriptor PRD may mean information of a location where data corresponding to a data write command generated from the host is to be stored and information of a location where data corresponding to a read command generated from the host is stored.

The components 1100, 1200 and 1300 may constitute a host of the storage device 1400. For example, the host may request a reading operation on required data of data stored at the storage device 1400 or a writing operation on required data at the storage device 1400.

The storage device 1400 may be configured to communicate with the processor 1200 and the system memory 1300 through the bus 1100. For example, the storage device 1400 may communicate with the processor 1200 and the system memory 1300 based on the PCIe interface. The storage device 1400 may be used to retain data for a relatively long time.

The storage device 1400 may include a nonvolatile memory 1410 and a memory controller 1420.

The nonvolatile memory 1410 may include at least one of a flash memory, a random-access memory (RAM), a phase change RAM (PRAM), a magnetic RAM (MRAM), a resistive RAM (RRAM), a ferroelectric RAM (FRAM), and other like nonvolatile memory devices.

The memory controller 1420 may be configured to communicate with the processor 1200 and the system memory 1300 through the bus 1100 and control the nonvolatile memory 1410.

The memory controller 1420 may include an interface which is recognized as storage by the bus 1100 or the processor 1200. For example, if the storage device 1400 is connected with the bus 1100, the memory controller 1420 may perform predetermined communication with the processor 1200 or the bus 1100. According to a result of the predetermined communication, the storage device 1400 may be recognized as storage by the bus 1100 or the processor 1200. That is, the memory controller 1420 may communicate with the processor 1200 and the system memory 1300 based on a standard interface (e.g., PCIe) of the computing system 1000, and may include an interface which is recognized as storage by the bus 1100 or the processor 1200. The memory controller 1420 will be more fully described with reference to FIG. 2.

Figure 2:
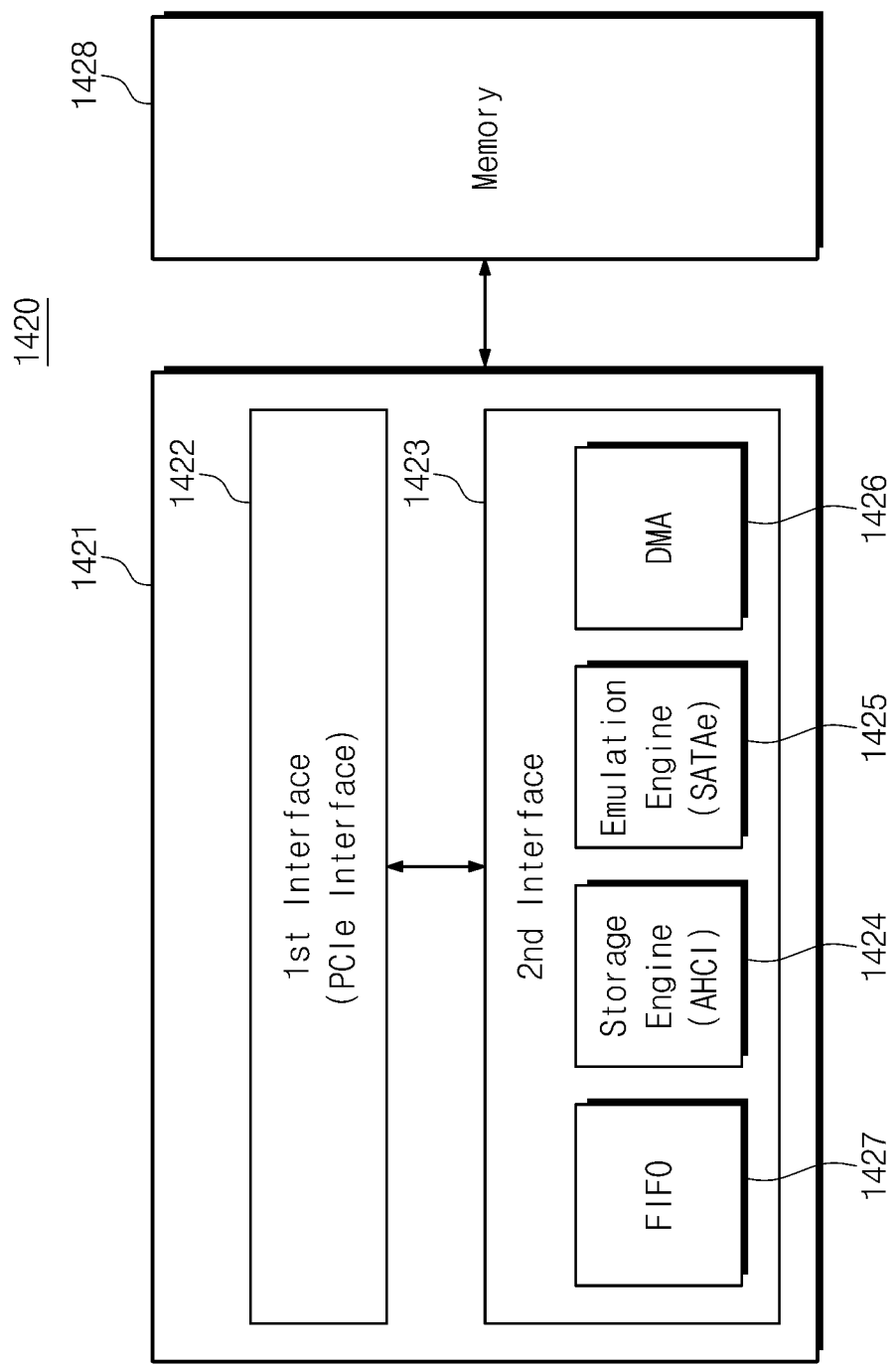
FIG. 2 is a block diagram schematically illustrating a memory controller according to an example embodiment of the inventive concepts.

FIG. 2 is a block diagram schematically illustrating a memory controller according to an example embodiment of the inventive concepts.

Referring to FIG. 2, a memory controller 1420 may include a controller core 1421 and a memory 1428. The controller core 1421 may use the memory 1428 as a working memory or a buffer memory. The memory 1428 may include a volatile memory, such as a RAM, an SRAM, a DRAM, an SDRAM, a phase change RAM (PRAM), a magnetic RAM (MRAM), a resistive RAM (RRAM), a ferroelectric RAM (FRAM), or other like volatile memory devices. The memory 1428 may additionally (or alternatively) include a nonvolatile memory, such as a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and other like nonvolatile memory devices.

The controller core 1421 may include a first interface 1422 and a second interface 1423.

The controller core 1421 may be configured to receive a command issue through the first interface 1422 from a host (refer to FIG. 1). The command issue may be a message indicating that a command is generated from the host. In detail, the first interface 1422 may communicate with the bus 1100 based on a standard interface of the computing system 1000. For example, the first interface 1422 may include a PCIe interface as a standard interface of the bus 1100 in the computing system 1000.

The second interface 1423 may be configured to receive a command issue through the first interface 1422 from the host. The second interface 1423 may communicate with the bus 1100 in the computing system 1000 through the first interface 1422, and may communicate with a nonvolatile memory 1410 (refer to FIG. 1). The second interface 1423 may include an interface which is recognized as storage by the processor 1200 or the bus 1100.

The second interface 1423 may include a storage engine 1424, an emulation engine 1425, and a Direct Memory Access (DMA) 1426, and a FIFO memory 1427.

The storage engine 1424 may include an interface which is recognized as storage by the processor 1200 or the bus 1100. For example, the storage engine 1424 may include an Advanced Host Control Interface (MCI). However, the inventive concepts are not limited thereto. The storage engine 1424 may include various interfaces recognized as storage by a standard interface of the processor 1200 or the computing system 1000, without installation of a separate driver.

The storage engine 1424 may include a register (not shown) indicating that a command is issued from the host. For example, the storage engine 1424 may include a PxCI register defined by the MCI specification. When the PxCI register is set by a specific bit value (e.g., such a case that a register value is changed from '0' to '1'), the storage engine 1424 may recognize that a command is issued from the host.

The storage engine 1424 may be configured to fetch a command header CH from the command table 1310 in the system memory 1300 in response to a command issue from the host. The storage engine 1424 may fetch a command frame CFIS referring to the fetched command header CH. Also, the storage engine 1424 may obtain an address value of the physical region descriptor table 1320 referring to the fetched command header CH.

The storage engine 1424 may be configured to fetch a physical region descriptor PRD on data corresponding to a command from the physical region descriptor table 1320 in response to a command issue from the host. In detail, before a setup frame DMAsetup FIS is received from emulation engine 1425, the storage engine 1424 may access the system memory 1300 to fetch the physical region descriptor PRD. The fetched physical region descriptor PRD may be stored at the first-in first-out (FIFO) memory 1427. For example, the storage engine 1424 may fetch the physical region descriptor PRD until the FIFO memory 1427 is full. As shown, FIG. 2 illustrates an example embodiment in which the FIFO memory 1427 is a separated component. However, the inventive concepts are not limited thereto. For example, the FIFO memory 1427 may be a region of a memory 1428.

According to various embodiments, the setup frame DMAsetup FIS may indicate communication ready state information for data corresponding to a command from the host. For example, the physical region descriptor PRD may include location information of data corresponding to a command generated from the host. The physical region descriptor PRD may indicate a location where data corresponding to a data write command generated from the host is to be stored and information of a location where data corresponding to a read command generated from the host is stored.

The emulation engine 1425 may be configured to generate the setup frame DMAsetup FIS in response to a command issue from the host. The setup frame DMAsetup FIS may be transferred to the storage engine 1424.

The emulation engine 1425 may emulate a storage interface that is configured for the storage engine 1424 to control. For example, the AHCI may be configured to control a Serial AT Attachment (SATA) interface. When the storage engine 1424 includes the AHCI, the emulation engine 1425 may emulate an SATA or SATAe interface. The emulation engine 1425 may be provided for a normal operation.

For example, the AHCI may be configured to communicate with an upper constituent element (e.g., a processor 1200 or a bus 1100 of a computing system 1000) through a PCIe interface and to communicate with a lower constituent element (e.g., storage 1400) through a SATA or SATAe interface. The AHCI may operate normally when both an upper channel and a lower channel operate according to the specification. Thus, the emulation engine 1425 may be provided to secure a normal operation of the storage engine 1424.

The processor 1200 may receive a request from the DMA 1426 such that the second interface 1423 accesses the system memory 1300 through the bus 1100.

As described above, the storage engine 1424 in the memory controller 1420 according to an embodiment of the inventive concepts may fetch the physical region descriptor PRD from the system memory 1300 in response to a command issue from a host before the setup frame DMAsetup FIS is received from the system memory 1300.

Thus, the memory controller 1420 may perform data communications with the host without waiting until the setup frame DMAsetup FIS is sent to the storage engine 1424. A data transfer operation between the memory controller 1420 and the host may be performed through the first interface 1422. Accordingly, a processing time of the memory controller 1420 corresponding to a command issue of a host may be shortened. This may mean that the performance of the memory controller 1420 is improved.

Figure 3:
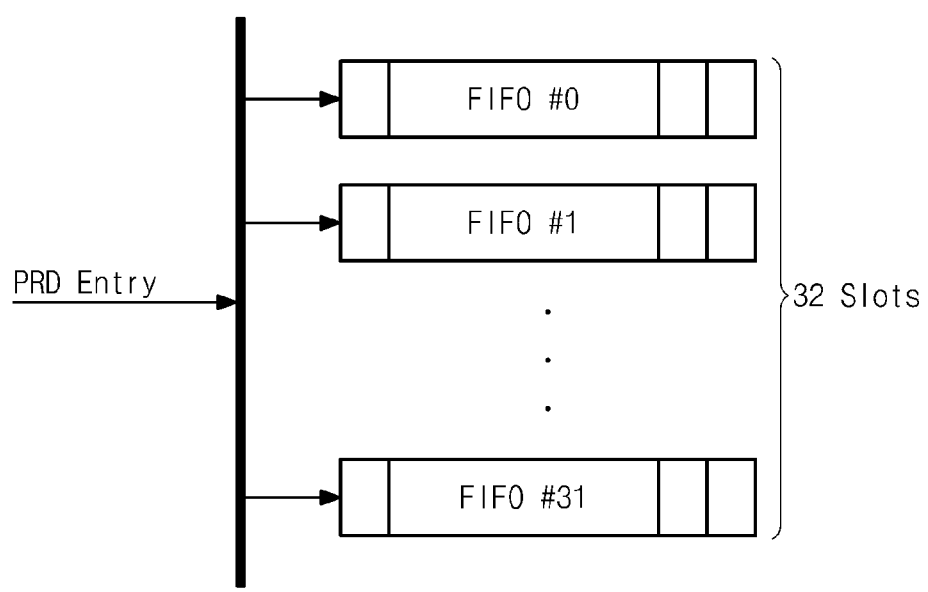
FIG. 3 is a block diagram schematically illustrating a FIFO memory of FIG. 2.

FIG. 3 is a block diagram schematically illustrating a FIFO memory of FIG. 2.

Referring to FIG. 3, a FIFO memory 1427 may have slots the number of which corresponds to an outstanding command according to the MCI specification. For example, the FIFO memory 1427 may have 32 slots.

Physical region descriptors PRD fetched by a storage engine 1424 may be stored at the FIFO memory 1427. For example, physical region descriptors PRD may be stored at slots FIFO#0 to FIFO#31 of the FIFO memory 1427 according to a fetched order.

Figure 4:
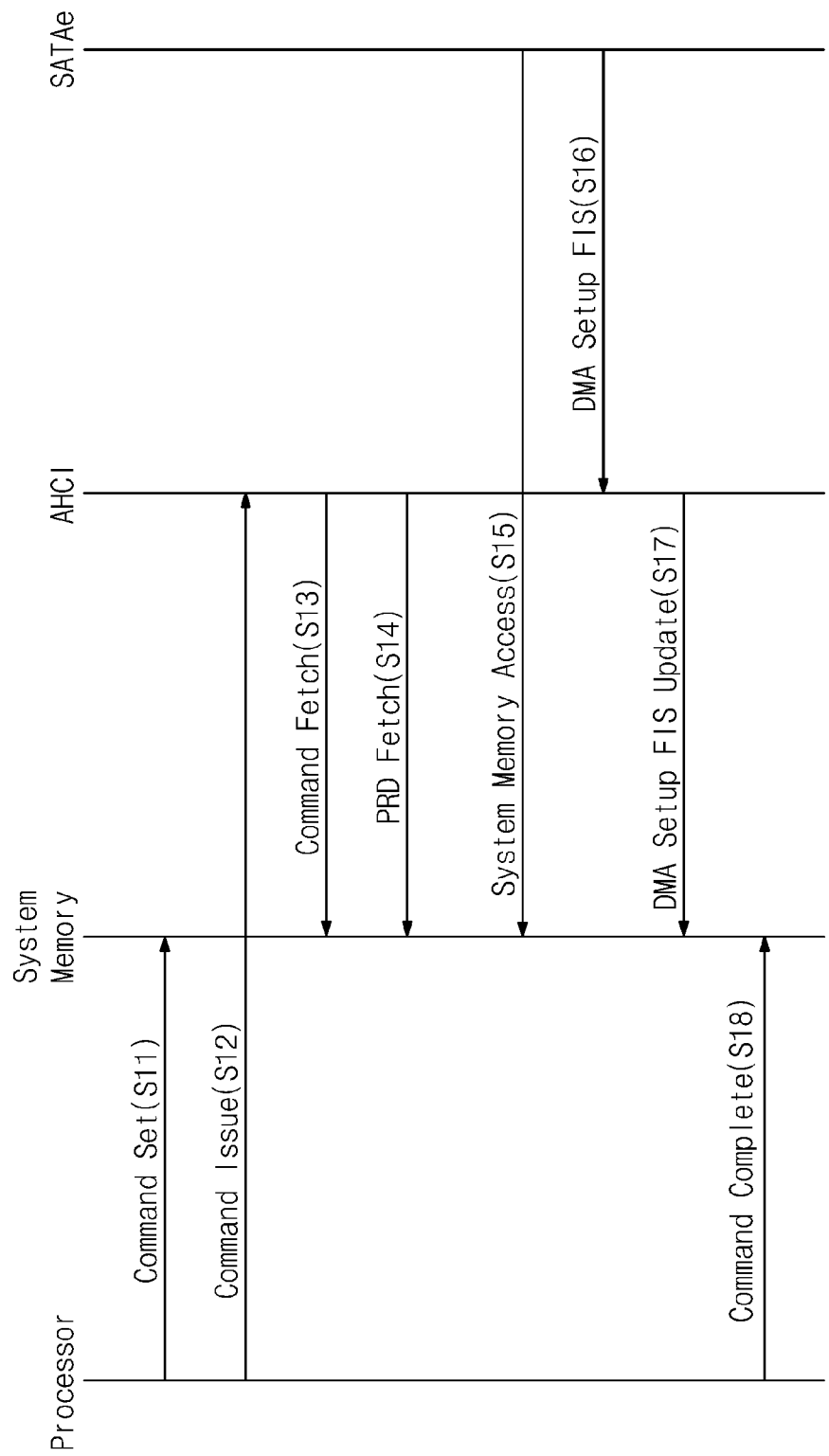
FIG. 4 is a flowchart schematically illustrating an operation of a computing system according to an example embodiment of the inventive concepts.

FIG. 4 is a flowchart schematically illustrating an operation of a computing system according to an example embodiment of the inventive concepts.

Referring to FIGS. 1, 2, and 4, in operation S11, a processor 1200 sets a system memory 1300 through a bus 1100. For example, the processor 1200 may set a command table 1310 of the system memory 1300 with a command. The command may include a command header CH and a command frame CFIS.

In operation S12, the processor 1200 sends a command issue to a memory controller 1420 through the bus 1100. For example, the processor 1200 may send the command issue to a storage engine 1424 of the memory controller 1420. The processor 1200 may set an internal register (e.g., a PxCI register) of the storage engine 1424 with a specific bit value to inform that a command is issued.

In operation S13, the memory controller 1420 fetches a command in response to the command issue. In detail, the storage engine 1424 of the memory controller 1420 may access a command table 1310 in the system memory 1300 to fetch a command header CH. The storage engine 1424 may fetch a command frame CFIS from the command table 1310 in the system memory 1300 referring to the fetched command header CH.

In operation S14, the storage engine 1424 of the memory controller 1420 accesses the system memory 1300 in order to fetch a physical region descriptor PRD in response to the command issue. In detail, the storage engine 1424 may access a physical region descriptor table 1320 of the system memory 1300 to fetch a physical region descriptor PRD. The physical region descriptor PRD may include location information of data corresponding to a command issued from the host, for example.

In operation S15, an emulation engine 1425 accesses the system memory 1300 to transmit and receive data corresponding to a command from the host. For example, if a command from the host is a write command, the emulation engine 1425 may receive data from the system memory 1300. If a command from the host is a read command, the emulation engine 1425 may transmit data to the system memory 1300.

In operation S16, the emulation engine 1426 sends a setup command DMAsetup FIS to the storage engine 1424. The setup frame DMAsetup FIS may indicate that communication ready state information of data corresponding to a command from the processor 1200, for example.

In operation S17, the storage engine 1424 sends the setup command DMAsetup FIS to the system memory 1300.

In operation S18, in the event that a command issued is processed, the processor 1200 sends a command complete message to the system memory 1300.

As described above, the storage engine 1424 in the memory controller 1420 according to an embodiment of the inventive concepts may fetch the physical region descriptor PRD from the system memory 1300 in response to a command issue from a host before the setup frame DMAsetup FIS is received from the system memory 1300.

Thus, the memory controller 1420 may perform data communications with the host without waiting until the setup frame DMAsetup FIS is sent to the storage engine 1424. A data transfer operation between the memory controller 1420 and the host may be performed through the first interface 1422. That is, a processing time of the memory controller 1420 corresponding to a command issue of a host may be shortened. This may mean that the performance of the memory controller 1420 is improved.

Figure 5:
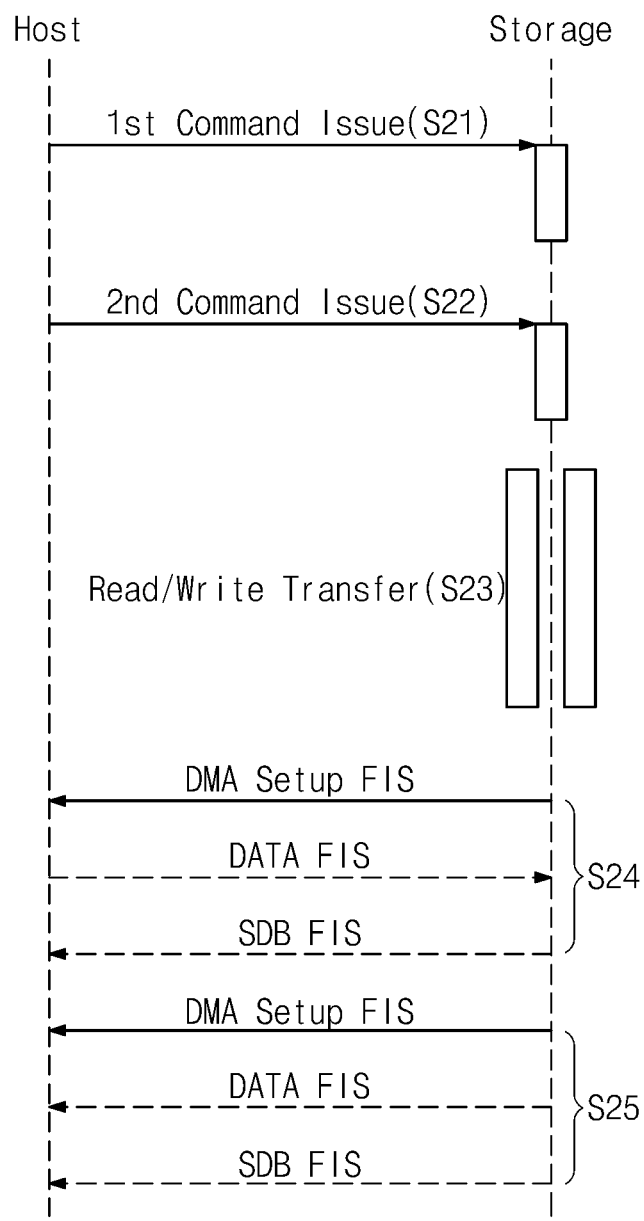
FIG. 5 is a flowchart schematically illustrating an operation of a computing system according to another example embodiment of the inventive concepts.

FIG. 5 is a flowchart schematically illustrating an operation of a computing system according to another example embodiment of the inventive concepts. FIG. 5 illustrates an example in which a plurality of commands are issued from a host.

Referring to FIG. 5, in operation S21, a host (refer to FIG. 1) sends a first command to storage 1400. In operation S22, the host sends a second command to the storage 1400. For example, the first command may be a data write command, and the second command may be a read command. Accordingly, in various embodiments the host may sequentially send the first command and the second command to the storage 1400.

In operation S23, the storage 1400 performs data communications with the host in response to the first command and the second command. As described with reference to FIG. 2, a storage engine 1424 of a memory controller 1420 may communicate with the host through a first interface 1422 and with a nonvolatile memory 1410 (refer to FIG. 1) through a second interface 1423. The first interface 1422 may be a PCIe interface, for example.

Thus, an emulation engine 1425 of the storage 1400 may perform data communications with the host through the storage engine 1424 and the first interface 1422 in response to a command from the host. In particular, since a PCIe interface supports a full-duplex data transfer operation, the emulation engine 1425 may receive data from the host in response to the first command and transmit data to the host in response to the second command.

In operation S24, the storage 1400 sends a setup frame DMAsetup FIS to the host in response to the first command, receives a data frame Data FIS from the host, and sends a transfer complete frame SDB FIS to the host.

In operation S25, the storage 1400 sends a setup frame DMAsetup FIS to the host in response to the second command, receives a data frame Data FIS from the host, and sends a transfer complete frame SDB FIS to the host.

Meanwhile, operations S24 and S25 may be understood to be operations for maintaining compatibility with the SATA and MCI specifications.

Figure 6:
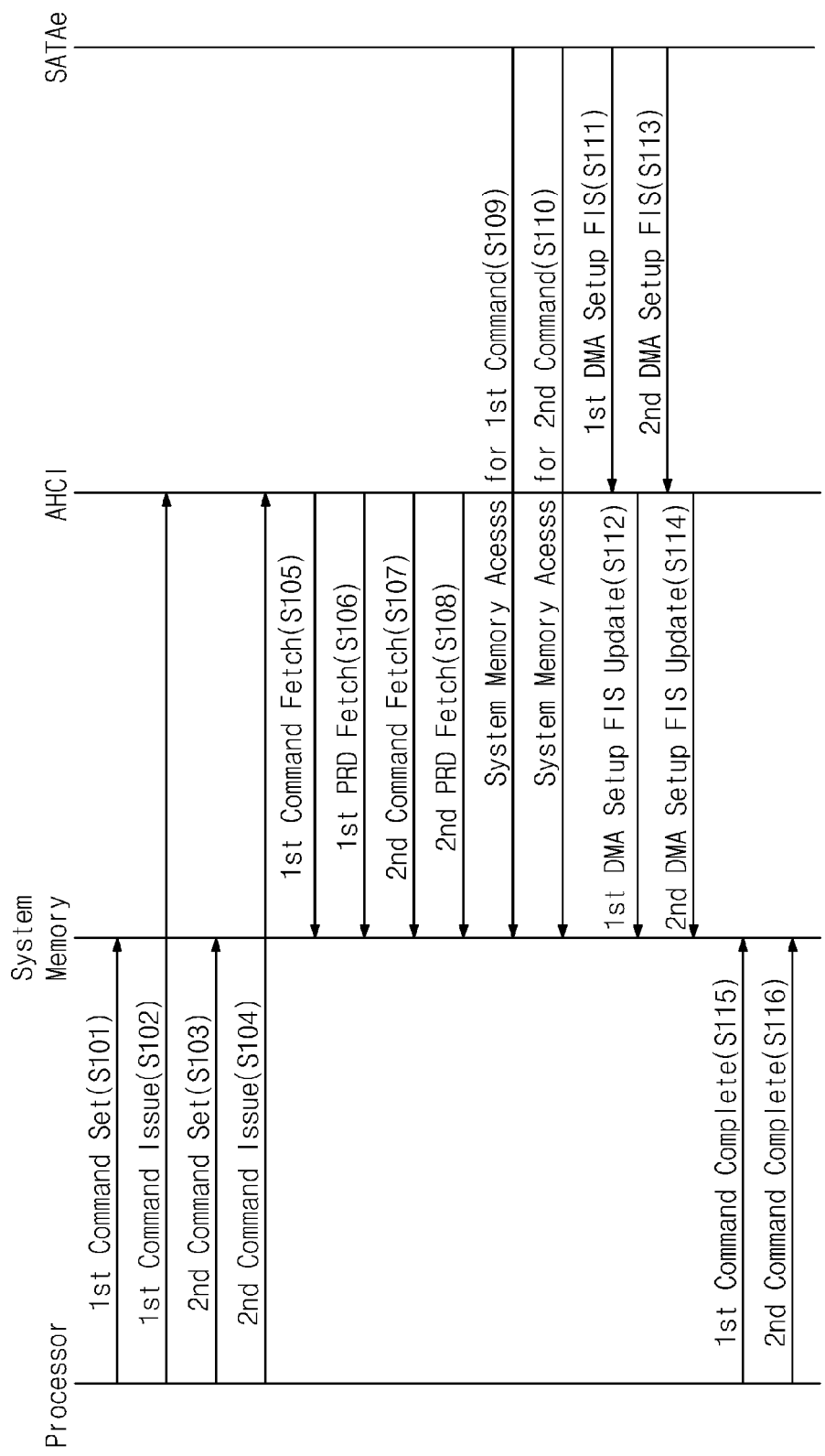
FIG. 6 is a flowchart schematically illustrating an operation of a computing system of FIG. 5.

FIG. 6 is a flowchart schematically illustrating an operation of a computing system of FIG. 5. Since operations of a processor 1200, a system memory 1300, a storage engine 1424, and an emulation engine 1425 on a first command are equal to those on a second command, a duplicated description may be skipped.

Referring to FIG. 6, in operation S101, the processor 1200 sets the system memory 1300 with a first command through a bus 1100. In detail, the processor 1200 may set a command table 1310 of the system memory 1300 with the first command. For example, the first command may be a data write command. The first command may include a command header CH and a command frame CFIS.

In operation S102, the processor 1200 sends a first command issue to a memory controller 1420 through the bus 1100. In detail, the processor 1200 may send the first command issue to the storage engine 1424 of the memory controller 1420. For example, the processor 1200 may set an internal register (e.g., a PxCI register) of the storage engine 1424 with a specific bit value to inform that the first command is issued.

In operation S103, the processor 1200 sets the system memory 1300 with a second command through the bus 1100.

In detail, the processor 1200 may set the command table 1310 of the system memory 1300 with the second command. For example, the second command may be a read command.

In operation S104, the processor 1200 sends a second command issue to the memory controller 1420 through the bus 1100.

In operation S105, the memory controller 1420 fetches a first command in response to the first command issue. In detail, the storage engine 1424 of the memory controller 1420 may access a command table 1310 of the system memory 1300 to fetch a command header CH of the first command. The storage engine 1424 may fetch a command frame CFIS from the command table 1310 of the system memory 1300 referring to the fetched command header CH.

In operation S106, the storage engine 1424 of the memory controller 1420 accesses the system memory 1300 in order to fetch a physical region descriptor PRD in response to a command issue. In detail, the storage engine 1424 may access a physical region descriptor table 1320 of the system memory 1300 to fetch a physical region descriptor PRD. For example, the physical region descriptor PRD may include location information of data corresponding to the first command issued from the host.

In operation S107, the memory controller 1420 fetches a second command in response to the second command issue.

In operation S108, the storage engine 1424 of the memory controller 1420 accesses the physical region descriptor table 1320 of the system memory 1300 to fetch a physical region descriptor PRD. For example, the physical region descriptor PRD may include location information of data corresponding to the second command issued from the host is to be stored.

In operation S109, the emulation engine 1425 accesses the system memory 1300 to receive data corresponding to the first command from the host.

In operation S110, the emulation engine 1425 accesses the system memory 1300 to transmit data corresponding to the second command from the host.

In operation S111, the emulation engine 1426 sends a setup frame DMAsetup FIS to the storage engine 1424. The setup frame DMAsetup FIS may indicate a communication ready state information for data corresponding to the first command from the processor 1200, for example.

In operation S112, the storage engine 1424 transfers a setup frame DMAsetup FIS corresponding to the first command to the system memory 1300.

In operation S113, the emulation engine 1426 transfers a setup frame DMAsetup FIS corresponding to the second command to the storage engine 1424.

In operation S114, the storage engine 1424 transfers a setup frame DMAsetup FIS corresponding to the second command to the system memory 1300.

In operation S115, when the first command is processed, the processor 1200 sends a first command complete message to the system memory 1300.

In operation S116, when the second command is processed, the processor 1200 sends a second command complete message to the system memory 1300.

Meanwhile, operations S111 to S114 may be understood to be operations for maintaining compatibility with the SATA and MCI specifications.

As described above, the emulation engine 1425 of the memory controller 1420 may perform data communications with the host through the storage engine 1424 and the first interface 1422 in response to a command from the host. In particular, since a PCIe interface supports a full-duplex data transfer operation, the emulation engine 1425 may receive data from the host in response to the first command and transmit data to the host in response to the second command. Thus, a processing time of the memory controller 1420 corresponding to a command issue of a host may be further reduced. This may mean that the performance of the memory controller 1420 is improved.

Figure 7:
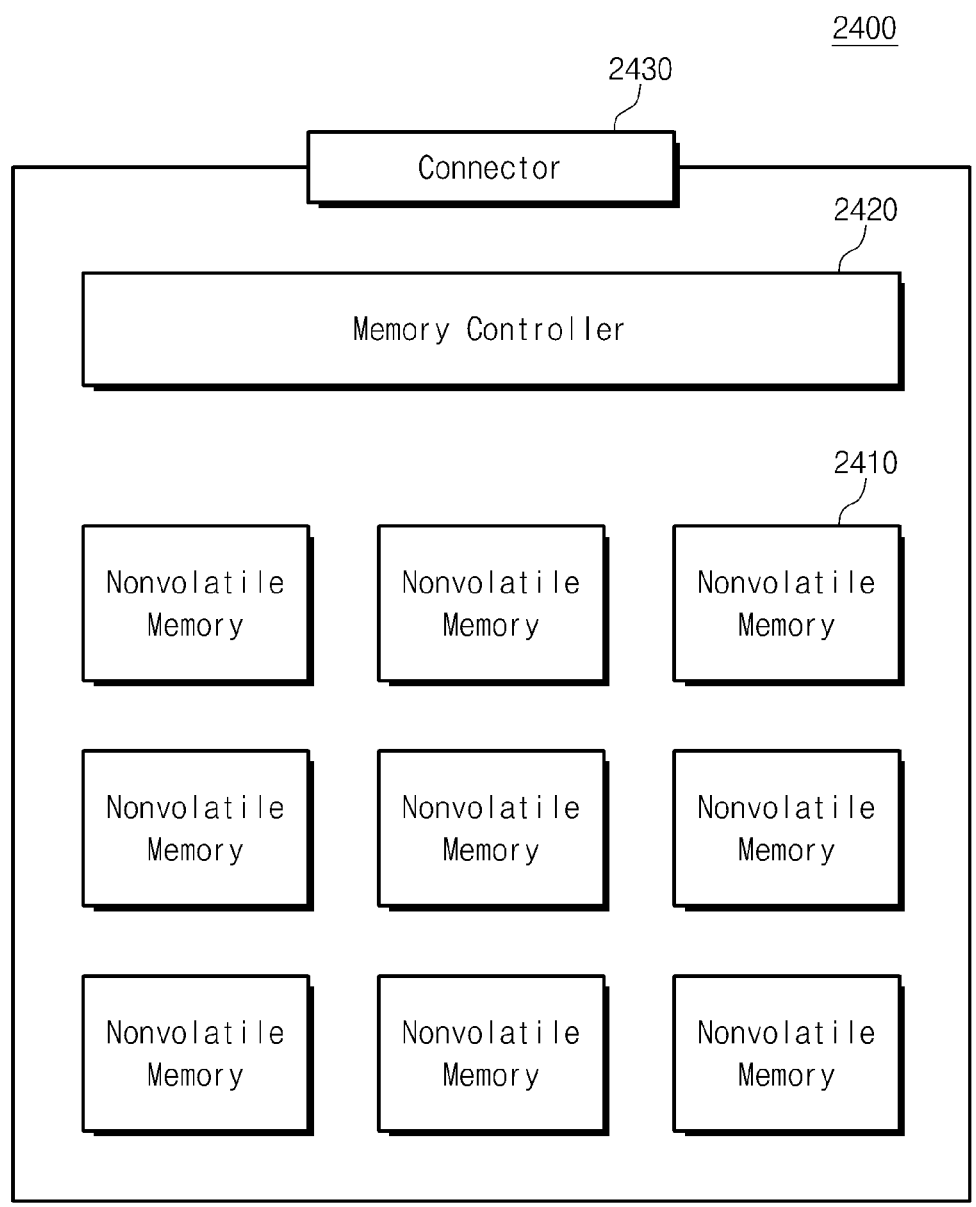
FIG. 7 is a block diagram schematically illustrating storage 2400 according to another embodiment of the inventive concepts.

FIG. 7 is a block diagram schematically illustrating storage 2400 according to another embodiment of the inventive concepts. Referring to FIG. 7, storage 2400 may include a plurality of nonvolatile memories 2410, a memory controller 2420, and a connector 2430.

The memory controller 2420 may operate the same or similarly as the memory controller 1420 as described with reference to FIG. 2.

The connector 2430 may connect the storage 2400 with a host. For example, the connector 2430 may be a connector of a standard interface used at the host. The connector 2430 may be a connector of a PCIe interface.

The storage 2400 may be a solid state drive (SSD). The storage 2400 may be connected with a host (e.g., a server, a main frame, and the like) which may require high-speed and mass storage.

While the inventive concepts has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A memory controller, comprising:
   a first interface configured to provide an interface for communications with a host; and
   a second interface configured to communicate with the host through the first interface and to provide an interface for communications with a memory device, the second interface including,
      an emulation engine configured to generate a Direct Memory Access (DMA) setup Frame Information Structure (FIS) including ready state information for data communications with the host in response to a command transferred from the host; and
      a storage engine configured to access the host to fetch a physical region descriptor (PRD) before the DMA setup FIS is received from the emulation engine.

2. The memory controller of claim 1, wherein the storage engine includes an Advanced Host Control Interface (AHCI).

3. The memory controller of claim 2, wherein the emulation engine is configured to perform a data communication with the host before sending the DMA setup FIS to the storage engine.

4. The memory controller of claim 3, wherein the emulation engine is configured to perform the data communication with the host independently while generating the DMA setup FIS.

5. The memory controller of claim 1, wherein the first interface is a Peripheral Component Interconnect express (PCIe) interface and the second interface is an Serial AT Attachment (SATA) interface.

6. The memory controller of claim 1, wherein the storage engine includes a PxCI register and the storage engine is configured to recognize a command issued from the host by setting the PxCI register with a bit value.

7. The memory controller of claim 1, further comprising:
   a FIFO memory configured to store the PRD.

8. An operating method of a memory controller, comprising:
   receiving, by the memory controller, a command issued from a host;
   fetching, by the memory controller, a command corresponding to the issued command in response to receiving the issued command;
   fetching, by the memory controller, a physical region descriptor (PRD) from the host based on the fetched command; and
   generating, by the memory controller, a Direct Memory Access (DMA) setup Frame Information Structure (FIS) including a data communication ready state information corresponding to the issued command.

9. The operating method of claim 8, wherein the fetching a command comprises:
   fetching a command header corresponding to the command; and
   fetching a command frame indicated by information in the command header.

10. The operating method of claim 9, wherein the fetching a PRD comprises:
    executing the fetched command according to information contained in the command header.

11. The operating method of claim 8, further comprising:
    performing data communication with the host according to the PRD, and the performing the data communication is independent from the generating.

12. The operating method of claim 11, wherein the performing data communication occurs before the generating.

13. The operating method of claim 11, wherein the performing data communication is based on an interface, the interface is included in the memory controller and is recognized as storage by the host.

14. The operating method of claim 11, wherein the performing data communication is based on an Advanced Host Controller interface (AHCI) included in the memory controller.

15. The operating method of claim 8, further comprising:
    transferring the DMA setup FIS to the host.

16. A method of operating a memory controller including a first interface and a second interface, the method comprising:
    receiving, by the second interface, a command issued by a host via the first interface; and
    fetching, by the second interface, a command corresponding to the issued command in response to receiving the issued command, and the fetching including,
       fetching a physical region descriptor (PRD) prior to receiving a Direct Memory Access (DMA) setup Frame Information Structure (FIS).

17. The method of claim 16, wherein the fetching comprises:
    fetching a command header from a command table in a system memory of the host in response to the issued command; and
    fetching the PRD from a physical region descriptor table of the host in response to a issued command.

18. The method of claim 16, further comprising:
    setting a register to include a value indicating that the issued command was received from the host.

19. The method of claim 18, wherein the second interface includes an Advanced Host Control Interface (AHCI) and the register is a PxCI register.

20. The method of claim 16, further comprising:
    receiving data from a system memory if the issued command is a write command; and
    transmitting data to the system memory if the issued command is a read command.

* * * * *